(12) United States Patent
Vu et al.

(10) Patent No.: US 12,521,027 B2
(45) Date of Patent: Jan. 13, 2026

(54) WEARABLE SYSTEM FOR FREQUENT AND COMFORTABLE BLOOD PRESSURE MONITORING FROM USER'S EAR

(71) Applicant: The Regents of the University of Colorado, a body corporate, Denver, CO (US)

(72) Inventors: Tam Vu, Boulder, CO (US); Robin Deterding, Boulder, CO (US); Nhat Pham, Boulder, CO (US); Nam Ngoc Bui, Broomfield, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 824 days.

(21) Appl. No.: 17/630,425

(22) PCT Filed: Jul. 23, 2020

(86) PCT No.: PCT/US2020/043321
§ 371 (c)(1),
(2) Date: Jan. 26, 2022

(87) PCT Pub. No.: WO2021/021579
PCT Pub. Date: Feb. 4, 2021

(65) Prior Publication Data
US 2022/0280056 A1     Sep. 8, 2022

Related U.S. Application Data

(60) Provisional application No. 62/900,182, filed on Sep. 13, 2019, provisional application No. 62/879,236, filed on Jul. 26, 2019.

(51) Int. Cl.
*A61B 5/022* (2006.01)
*A61B 5/00* (2006.01)
*A61B 5/021* (2006.01)
*A61B 5/024* (2006.01)

(52) U.S. Cl.
CPC .......... *A61B 5/02241* (2013.01); *A61B 5/002* (2013.01); *A61B 5/02116* (2013.01);
(Continued)

(58) Field of Classification Search
CPC . A61B 5/02241; A61B 5/002; A61B 5/02116; A61B 5/02141; A61B 5/02416;
(Continued)

(56) References Cited

U.S. PATENT DOCUMENTS 6,004,274 A * 12/1999 Nolan ................. A61B 1/2275
600/481
6,556,852 B1 * 4/2003 Schulze .................. A61B 5/01
600/323
(Continued)

FOREIGN PATENT DOCUMENTS

WO       2018/211052 A1    11/2018

OTHER PUBLICATIONS

International Search Report and Written Opinion received for PCT Patent Application No. PCT/US20/043321, mailed on Oct. 15, 2020, 20 pages.

*Primary Examiner* — Abid A Mustansir
(74) *Attorney, Agent, or Firm* — Workman Nydegger

(57) ABSTRACT

A device is able to measure blood pressure from inside a user's ear. In the illustrated example, the device has three components: (1) a pulse sensor attached to an inflatable pipe which is placed inside the ear, (2) an air pump with a controller, and (3) blood pressure estimation modules including processors and computer executable instruction executed on the processors to execute blood pressure estimation algorithms.

15 Claims, 11 Drawing Sheets

(52) U.S. Cl.
CPC ...... *A61B 5/02141* (2013.01); *A61B 5/02416* (2013.01); *A61B 5/6817* (2013.01); *A61B 2562/0247* (2013.01)

(58) Field of Classification Search
CPC .......... A61B 5/6817; A61B 2562/0247; A61B 5/02422; A61B 5/6803; A61B 5/02225; A61B 5/1455; A61B 5/02
See application file for complete search history.

(56) References Cited

U.S. PATENT DOCUMENTS

| | | | |
|---|---|---|---|
| 2002/0188206 A1* | 12/2002 | Davis | A61B 5/022 600/490 |
| 2004/0059234 A1* | 3/2004 | Martin | A61B 5/024 600/500 |
| 2006/0173363 A1 | 8/2006 | Felder et al. | |
| 2006/0206014 A1* | 9/2006 | Ariav | A61B 5/01 374/E13.002 |
| 2009/0069645 A1* | 3/2009 | Nielsen | A61B 5/6817 600/301 |
| 2009/0131761 A1 | 5/2009 | Moroney, III et al. | |
| 2010/0049007 A1 | 2/2010 | Sterling et al. | |
| 2010/0228315 A1 | 9/2010 | Nielsen | |
| 2013/0165800 A1* | 6/2013 | Shimizu | A61B 5/02438 600/485 |
| 2013/0253341 A1 | 9/2013 | Sethi et al. | |
| 2017/0209052 A1* | 7/2017 | Nakamura | A61B 5/0205 |
| 2018/0042496 A1* | 2/2018 | Lachhman | A61B 5/742 |
| 2019/0065970 A1 | 2/2019 | Beyers et al. | |
| 2019/0192018 A1* | 6/2019 | Zhang | A61B 5/02416 |

* cited by examiner

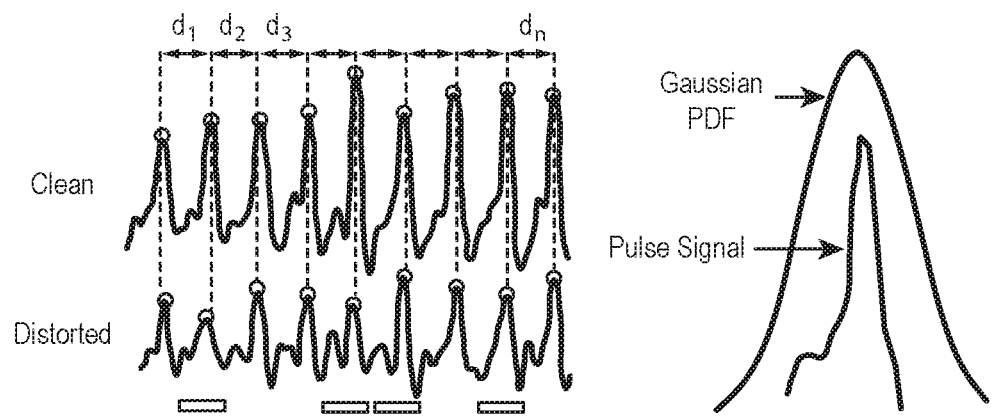
*FIG. 12*
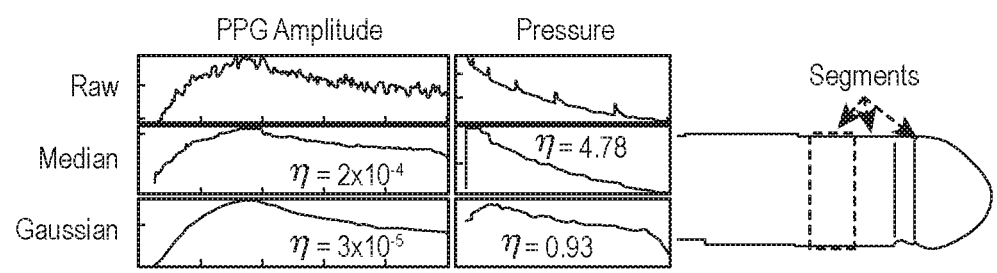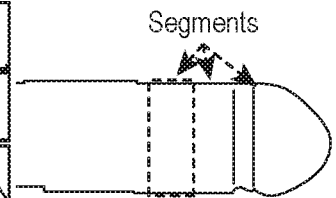
*FIG. 13A*   *FIG. 13B*   *FIG. 13C*

WEARABLE SYSTEM FOR FREQUENT AND COMFORTABLE BLOOD PRESSURE MONITORING FROM USER'S EAR

CROSS-REFERENCE TO RELATED APPLICATIONS

This application is a nationalization of and claims priority to PCT Application No. PCT/US2020/043321 filed on Jul. 23, 2020 entitled "A Wearable System For Frequent And Comfortable Blood Pressure Monitoring From User's Ear", which claims the benefit of and priority to U.S. Provisional Patent Application Ser. No. 62/900,182 filed on Sep. 13, 2019 and entitled "Wearable System For Frequent And Comfortable Blood Pressure Monitoring From User's Ear" and U.S. Provisional Patent Application Ser. No. 62/879,236 filed on Jul. 26, 2019 and entitled "eBP: A Wearable System for Frequent and Comfortable Blood Pressure Monitoring From User's Ear". Each of the aforementioned applications are expressly incorporated herein by reference in their entirety.

BACKGROUND

Background and Relevant Art

Blood pressure is one of the foremost vital signs measured when patients first arrive in the hospital as blood pressure can provide doctors with insight to initiate their diagnosis. For example, chronic kidney disease, sleep apnea, adrenal and thyroid disorders can all cause high blood pressure, while low blood pressure indicates the possibility of heart or endocrine problems, dehydration, severe infection or even blood loss. Additionally, uncontrolled elevated blood pressure is a major symptom of many life-threatening diseases such as hypertension, heart failure or stroke. Until recently, the reliable way to measure blood pressure was done by a health care practitioner (HCP) such as a physician, doctor, or nurse. The clinician wraps an arm cuff around the patient's upper arm and rapidly inflates the cuff with air. Once the cuff has reached maximum inflation, air is slowly released, while the HCP observes the pulse sound, with a stethoscope over the brachial artery just below the arm cuff, to determine the systolic and diastolic pressures. Since the invention of digital blood pressure devices, non-medical trained users can self-measure their blood pressure at home. As an acoustic sensor can replace the stethoscope, and a pressure sensor with a DC pump can substitute the pressure gauge and hand pump.

However, these devices often cause discomfort and inconvenience for those who need frequent blood pressure monitoring such as hemodialysis (kidney failure) patients, individuals with undiagnosed white coat hypertension or undiagnosed masked hypertension, which have a prevalence of 15-30% and 16.8% in the US respectively. There is also increasing use of frequent blood pressure monitoring for post-operative organ transplant recipients with more than 30,000 solid organ transplants occurring every year. In such cases, blood pressure is measured every 30 minutes for 24-hour while each hemodialysis session takes around four hours. Therefore, there is significant need for an unobtrusive blood pressure monitoring approach that allows for comfortable monitoring.

Due to the need of completely blocking the blood flow in the vein being measured, existing techniques cause discomfort when blood pressure is being measured frequently. The patient hardly rests because the measurement cuff constantly squeezes their arm. In the case of prolonged dialysis, patients hardly rest because the blood pressure cuff constantly squeezes their arm. Most current blood pressure monitoring devices include an arm cuff and a monitor that harnesses around the body, yet this often hinders the wearer's mobility.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a device for measuring blood pressure from inside the ear. The device includes a medical balloon configured in size and shape to be inserted into a user's ear. The device further includes an electronically controlled pump coupled to the medical balloon. The device further includes a pressure sensor coupled to the medical balloon. The device further includes a pulse sensor coupled to the medical balloon configured to capture a pulse signal from inside the ear. The device further includes an estimation module coupled to the pulse sensor and the pressure sensor, the estimation module configured to estimate blood pressure from the pulse signal and pressure from the pressure sensor.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 12 graphically illustrates peak interval variance versus entropy variance; and FIG. 13A-C illustrate results of median and Gaussian smoothing filters on amplitude and pressure trends and a balloon structure.

DETAILED DESCRIPTION

Some embodiments illustrated herein are able to measure blood pressure from inside a user's ear. In some embodiments, this has the results of minimizing the measurement's impact on users' normal activities while maximizing comfort level. In one illustrated example, a device has three components: (1) a light-based pulse sensor attached to an inflatable pipe which is placed inside the ear, (2) an air pump (which in some embodiments, may be a digitally controlled miniature air pump) with a fine controller, and (3) blood pressure estimation modules including processors and computer executable instruction executed on the processors to execute blood pressure estimation algorithms. In contrast to existing techniques, one illustrated embodiment introduces a novel technique that eliminates the need of completely blocking the blood flow inside the ear, which alleviates user's discomfort.

Figure 1:
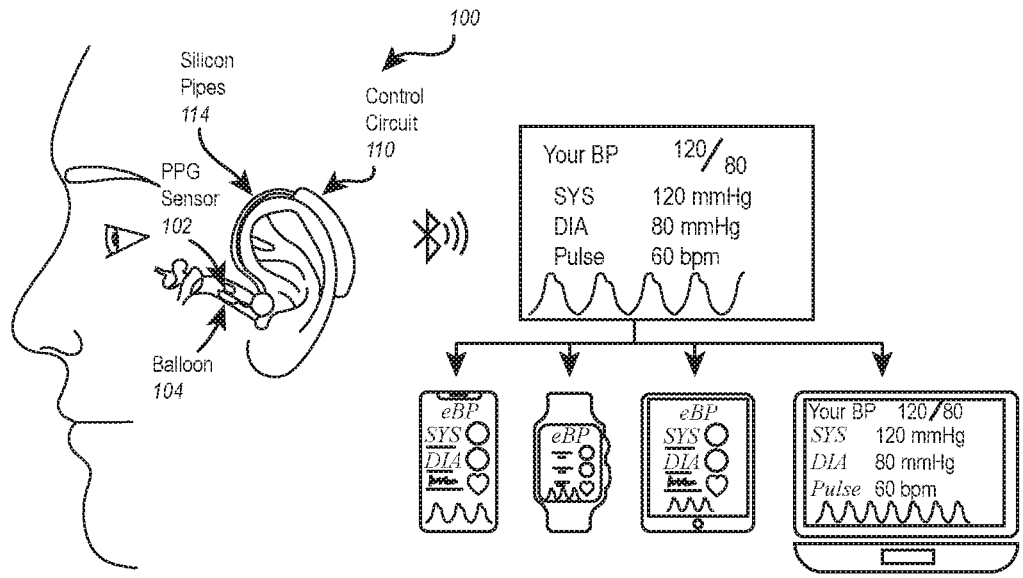
FIG. 1 illustrates an overview of an in-ear blood pressure measuring device.

Embodiments illustrated herein implement a novel wearable system 100 to capture blood pressure inside the ear, as illustrated in FIG. 1. Some embodiments include a discreet design, quiet components, and ability to apply in a convenient location. These features can be used to solve technical problems related to the uncomfortable nature of previous blood pressure monitors.

One example embodiment includes (1) a light-based pulse sensor 102 attached on an in-ear inflatable pipe (illustrated as balloon 104), (2) a digitally controlled, miniature air pump 106 (see FIG. 4), a pressure sensor 108 (see FIG. 4), and a valve controlling module implemented in a control circuit 110 to control a valve 112 to control the balloon's contact to the in-ear skin for pulse measurement, and (3) a blood pressure estimation module 116 (see FIG. 3) for executing an estimation algorithm. The blood pressure estimation module 116 may be implemented in one or more of a number of different hardware devices. For example, in some embodiments, the blood pressure estimation module 116 is included in hardware physically and electrically coupled to the pressure sensor 108. For example, the blood pressure estimation module may be implemented by executing computer executable instructions at the central controller 128 (see FIG. 4). Alternatively or additionally, data from the pressure sensor 108 may be provided to an external device, such as a smart phone, smart watch, tablet, computer, etc. (as illustrated in FIG. 1). The external device may receive the data by wireless connection, such as Bluetooth, Wi-Fi, near field communication, etc., wired communications such as serial data connections, ethernet, etc. The external device may include one or more processors and computer readable media (such as RAM, ROM, hard drives, and the like) storing computer executable instructions that when executed by the processor(s) cause the blood pressure estimation module 116 to be implemented. Thus, the in-ear balloon 104 is slowly inflated by the pump 106 to create light pressure onto the outer ear canal, pressure is detected by the pressure sensor 108 until the diastolic and the systolic value is estimated by the pressure estimation module 116.

Illustrated herein is a novel concept of in-ear frequent blood pressure monitoring that is feasible and comfortable. Further illustrated is a blocking-free optical-oscillometric approach to allow the in-ear sensor to measure important parameters in blood pressure measurements (i.e., systolic amplitude and diastolic amplitude). Embodiments illustrate a customized, off-the-shelf catheter used to implement the balloon 104 that can be safely inserted into the ear canal with a pulse sensor 102 attached. In addition, a portable in-ear wearable device to control the pulse sensor 102 and the catheter to capture the pulse signal, including blood pressure, accurately and reliably is illustrated. An algorithm is implemented on computer hardware including processors and computer readable media having computer executable instructions to process and qualify the highly noisy pulse signals captured from inside the ear to ensure the high-quality blood pressure measurements.

While one illustrated embodiment is currently a stand-alone device, with the continued trend of incorporating biometric monitoring into devices that are worn on a daily basis, there would be minimal behavioral changes required on the part of the wearer to benefit from at least one illustrated embodiment. As ear-worn devices are becoming increasingly popular, one embodiment could potentially be integrated into a headphone or hearing aid, both of which are ubiquitous as the World Health Organization reports that approximately 466 million people worldwide suffer from disabling hearing loss and more than 365 million headphones were sold in 2017 in the US alone. In addition, the calculation algorithm can be applied to make existing cuff devices more comfortable. In the case of hardware designs of embodiments of the invention, the use of a medical balloon to deliver a sensor into the ear can widely benefit other applications. For example, it can improve the contacting points and the conductivity of electrodes for in-ear sensing areas.

Measuring blood flow pressure can be done with both invasive or non-invasive methods. Although invasive approaches promise highly accurate results they are costly and only available in clinics. Noninvasive techniques are far more favorable as their processes are quick, low cost and relatively simple. However, the techniques cannot continuously measure blood pressure as provided by the invasive solutions.

Figure 2:
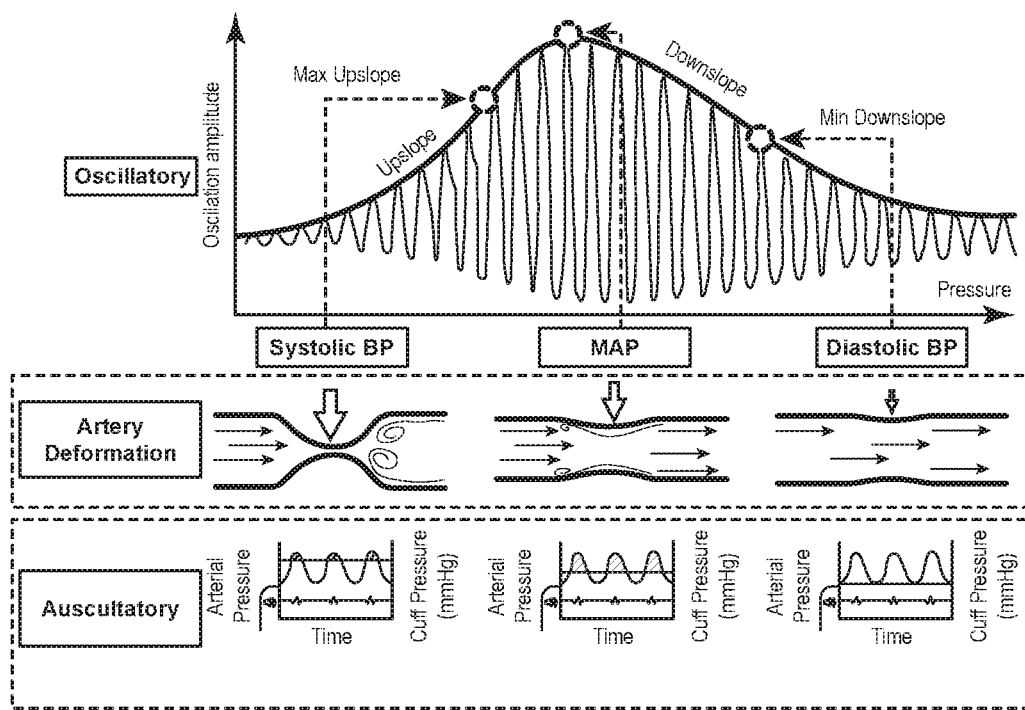
FIG. 2 illustrates a graphical representation of a response of blood artery to outer pressure that causes a measurement of blood pressure.

Artery deformation under the effects of cuff pressure grants the key signatures to estimate blood pressure as shown in FIG. 2. When the cuff pressure is equal to the systolic blood pressure, blood flow continues through the occluded artery, but only the highest arterial pressure can be detected. On the other hand, if the cuff pressure is lower than the diastolic blood pressure, the detected pulse is very weak. In auscultatory, medical practitioners listen to pulse sound propagation through a stethoscope to determine the blood pressure. Oscillatory, on the other hand, was developed for the digital device by estimating blood pressure from the change of pulse amplitude. It detects the Maximum Pulse Amplitude (MAP) Am first and applies predefined fractions of the peak amplitude ratio Am/As and Am/Ad to detect where the systolic and diastolic occurs and uses these values to infer the pressure. Am and Ad are the amplitude of systole and diastole, respectively. Unlike auscultatory, oscillatory does not need to completely occlude the blood vessel in order to detect the systolic blood pressure, which is wellsuited for the balloon model. However, current oscillation ratios are only applicable for arm or wrist blood pressure measurement models.

Generating a new in-ear ratio may be performed using a large scale data set including an invasive method to measure blood pressure from inside the ear. However, embodiments herein may be implemented using a technique to measure blood pressure without applying the characteristic ratios. To achieve this goal, the change of amplitude with respect to the change of cuff pressure is examined. Then, the key properties are extracted to formulate them into mathematical equations for processing. During the deflation:

Pulse amplitude increases when cuff pressure is close to the systolic level. The increment increases more quickly when the pressure reaches and passes through the systolic point.

At the systolic and diastolic cycle cross-section, the amplitude obtains its highest value (the MAP).

Amplitude rapidly decreases once the pressure passes the MAP and moderately decreases once it reaches the diastole point. In other words, the diastolic blood pressure position occurs at the highest decreasing amplitude.

These observations provide insights for composing solutions to detect MAP, systolic blood pressure and diastolic blood pressure. In particular, the diastolic position is the minimum of the downslope amplitude and MAP is the peak of the amplitude as shown in FIG. 2. The systolic location can be derived as being the maximum of the upslope amplitude. However, sometimes, the in-ear balloon 104 pressure might not reach the systolic phase due to the requirement of comfort. Therefore, some embodiments use the relational equation between MAP, systolic blood pressure and diastolic blood pressure:

$$P_{MAP} = \beta P_S + (1-\beta) P_D, \quad (1)$$

where $\beta$ is the systole ratio of the cardiac cycle and $P_{MAP}$, $P_S$ and $P_D$ are the MAP, systolic blood pressure and diastolic blood pressure respectively. Most literature reports $\beta$ as a fixed value that is widely accepted, but each person can have a slightly different ratio dependent on age, gender and health condition. Moreover, an incorrect estimation of $\beta$ increases the estimation error. In the one illustrated embodiment system, an adaptive estimation for $\beta$ based on the pulse wave form can be used.

Realizing the importance of frequent blood pressure monitoring and the discomfort of current devices, one illustrated embodiment is implemented as an ear-worn equipment to (1) capture the pulse signal inside the ear from a balloon-attached pulse sensor 102 and (2) use this information to estimate the blood pressure.

Some embodiments of the invention can include one or more of the following features: (1) allow frequent monitoring with minimal impact on user's mobility, (2) be comfortable, unobtrusive and easy to use, (3) and obtain a high accuracy blood pressure prediction.

Current commercialized devices are mostly cumbersome and require piped cuff attachment to the user's limb, which limits user's movements. Mounting the sensors onto glasses can significantly improve the flexibility, but it may be aesthetically unappealing and highly obtrusive. Therefore, measuring blood pressure from inside the ear can be done for portability, aesthetic appearance, comfort, and/or social acceptance.

While the systolic and diastolic ratio was invented for the arm cuff blood pressure, a new approach is implemented to identify the systolic blood pressure and diastolic blood pressure without using this characteristic fixed ratio.

Traditional approaches use a cuff to compress the artery on the arm or wrist for the pulse measurement. However, this is challenging to repeat inside the human ear as the in-ear balloon 104 can inflate in any direction, which affects the pulse measurement. Fortunately, the two sides of the ear canal are structured differently. In particular, one side (S1) of the canal includes an artery covered by muscles where the pulse signal could be captured while the other side (S2) is right next to a bone. When the in-ear balloon 104 is inflated, the balloon 104 expands and obtains contact with the artery at S1 and does not expand at S2. This mechanism creates a similar environment to the traditional approach used on the arm/wrist, such that an algorithm to measure blood pressure using the amplitude and pressure relationship from pulse measurement theory can be derived.

As the balloon 104 inflates and shrinks across multiple measurements, the action of adhering the pulse sensor 102 to the balloon 104 surface can wear out and be damaged, raising the concern that sensor can fall off inside the ear. Therefore, in some embodiments, the sensor is attached by firmly wiring and securing it on the balloon 104 surface.

The superficial artery is relatively small compared to the brachial artery. The sensor should face towards the artery in order to obtain a clear pulse signal. However, placing the pulse sensor 102 in the ear is not an easy-handling task as visibility is restricted. Therefore, some embodiments include a pulse-signal qualification model integrated into the design to precisely justify when the pulse signal is detected.

Figure 3:
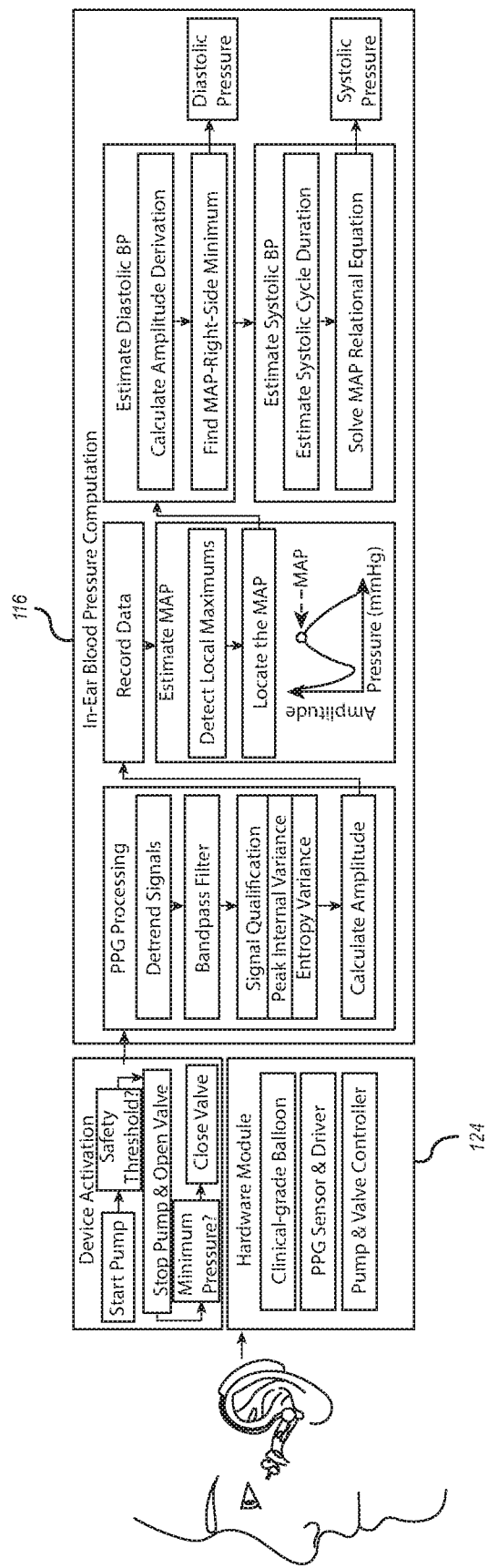
FIG. 3 illustrates a block diagram of an in-ear blood pressure measuring device.

Hypersensitive skin in the ear-canal spur safety and comfort concerns. One-third of the outer ear canal's skin is from 1 to 1.5 mm while the inner two-thirds is only 0.1 mm in thickness. Therefore, embodiments may be implemented which exclude electronic components that have toxic materials or sharp edges One illustrated embodiment includes three components: (1) a photoplethysmography (PPG) sensor 102 attached on an in-ear balloon, (2) a pump 106 and valve controlling module to control the balloon's contact to the in-ear skin for pulse measurement, and (3) a personalized blood pressure computation module 116 as illustrated in FIG. 3.

Unlike the oscillometric method, some embodiments do not apply the fixed-ratio blood pressure because there is no valid ratio for inside the ear. For safety purposes, the pressure does not cover the systolic blood pressure range. Therefore, some embodiments estimate the pressure in diastole first according to its minimal downslope amplitude. Then, the diastolic blood pressure is substituted into the MAP relational equation to estimate the systolic blood pressure. Moreover, a personalized approach to estimate the systolic fraction $\beta$ is used instead of using the common fixed ratio. A thorough explanation of the technique is presented below.

Similar to the conventional oscillometric method, MAP is the anchor to predict systolic and diastolic positions accurately. Occasionally, during the first few seconds of the balloon 104 deflating, a large drift away from the calibrated pressure can be detected. When this occurs, the maximum amplitude tends to fall into the drift's time window and reports erroneously high results. Moreover, the drift duration is unpredictable making it difficult to be eliminated by omitting the first few frames of data. Therefore, some embodiments detect the MAP based on its local maxima property regardless of the appearance of the drift.

Figure 6:
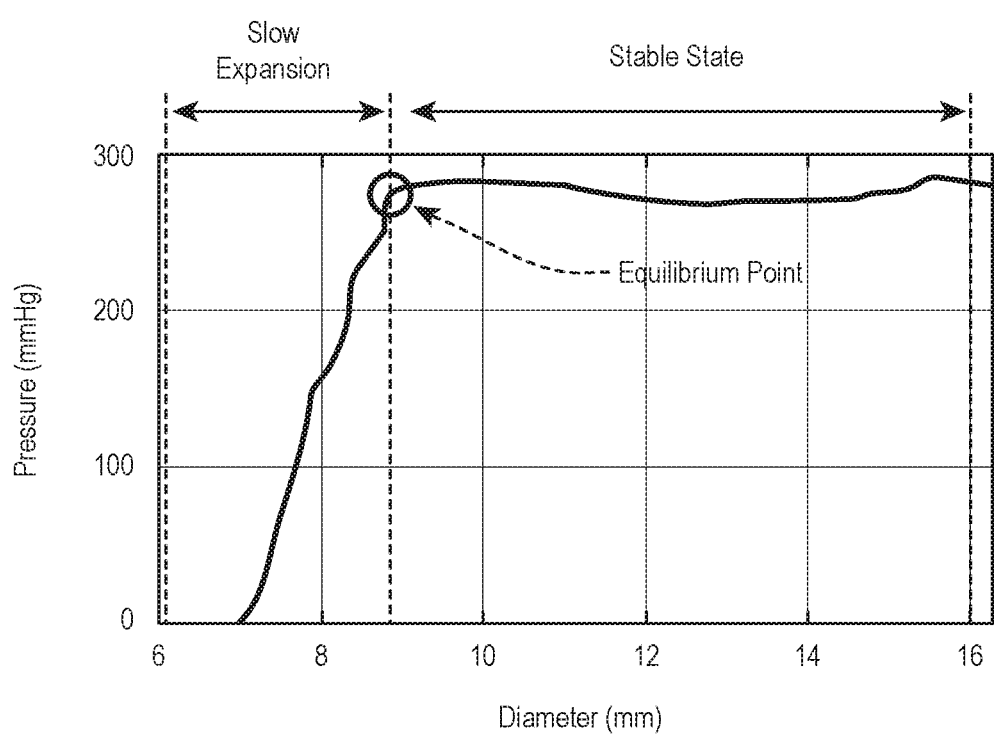
FIG. 6 illustrates a graph showing pressure versus diameter curve of a balloon.

One illustrated embodiment uses the light-based sensing technique, named photoplethysmography, to capture the superficial pulse (blood pressure value). The sensing algorithm will be described below. The sensor 102, in the illustrated example, has a size of 4.7 mm×2.5 mm×0.9 mm. The sensor 102 is small and sustainable enough to be attached to the balloon 104. However, state-of-the-art blood pressure sensing technology is often designed on a printed hard circuit board. When the sensor is placed on the balloon 104, its surface might create sharp contact which may hurt user's ear. To overcome this problem, some embodiments include a flexible BP sensing circuit 118 (See FIG. 6). This flexible circuit 118 adapts to the balloon's deformation making the device comfortable to use for a long period of time.

The balloon 104 may have one or more of the following characteristics: high elasticity, consistent, strong and resilient to scrubbing. In particular, as the balloon 104 inflates and shrinks across multiple blood pressure measurements, it is selected to have high elasticity durability. Additionally, the inflation and shrinking rate of the balloon 104 is consistent to maintain reliable measurements. The balloon 104 is selected to be strong and resilient to scrubbing so that the sensor can be reused multiple times. Some embodiments use a customized off-the-shelf medical balloon 104 often used for bladder catheterization.

The in-ear photoplethysmography power is weaker than that of the finger, wrist or arm. Therefore, after basic preprocessing, some embodiments employ two techniques for signal qualification including the Peak Interval Variation and Entropy Variance to eliminate bad data chunks and identify the correct position inside the ear to place the sensor. For conventional signal filtering, embodiments process every 50 milliseconds with DC removal and a band pass filter. This procedure helps to get rid of noise and other unwanted band signals, to disclose only the pulse waveform. With data that meets the criteria, embodiments calculate amplitude using the modified peak-to-peak technique.

Current peak-to-peak calculations are inconsistent for real-time processing due to the random order of peaks and troughs. However, this can be remedied by embodiments adding a verification module to ensure the order consistency.

Pump 106 and draining components are designed to inflate and shrink the balloon 104 within a predefined configuration. Embodiments may use miniaturized components in the pump 106 design. The control circuit will process the signal and detect whether the pressure is sufficient. Then, using this information, it will decide if more air should be pumped in or if the valve 112 should be opened to reduce pressure. Some embodiments may have portions that are worn outside the ear.

As described previously, some embodiments of the in-ear blood pressure measuring module include at least three components: (1) a photoplethysmography pulse sensor 102 attached on an in-ear balloon 104, (2) a pump 106 and valve controller (e.g., the control circuit 110) to control the balloon 104 to cause the balloon 104 to have good contact to the in-ear skin, and (3) a central sensing module (e.g., the blood pressure computation module 116) configured to compute the photoplethysmography value by controlling both the above mentioned two components for robust blood pressure monitoring using in-ear sensor. The following now illustrates additional details of each of these components.

The photoplethysmography pulse sensor 102 includes an LED 120 (transmitter) shining onto an artery and a photodiode 122 (receiver) capturing the reflected light. Since the human ear canal can be as small as 2.4 mm in diameter, both LED 120 and photodiode 122 are miniaturized to fit the ear canal. Second, the artery inside the ear canal is hidden deep below the skin. Thus, the LED 120 in the photoplethysmography pulse sensor 102 is selected to bright enough so that the light can penetrate the skin deeper and reach the artery. In addition, the photodiode 122 is selected to be highly sensitive to pick up the small reflected light. Fortunately, photoplethysmography measurement inside the ear does not suffer deleterious effects from ambient light. In particular, a whole noise term that comes from ambient light can be minimized.

Figure 4:
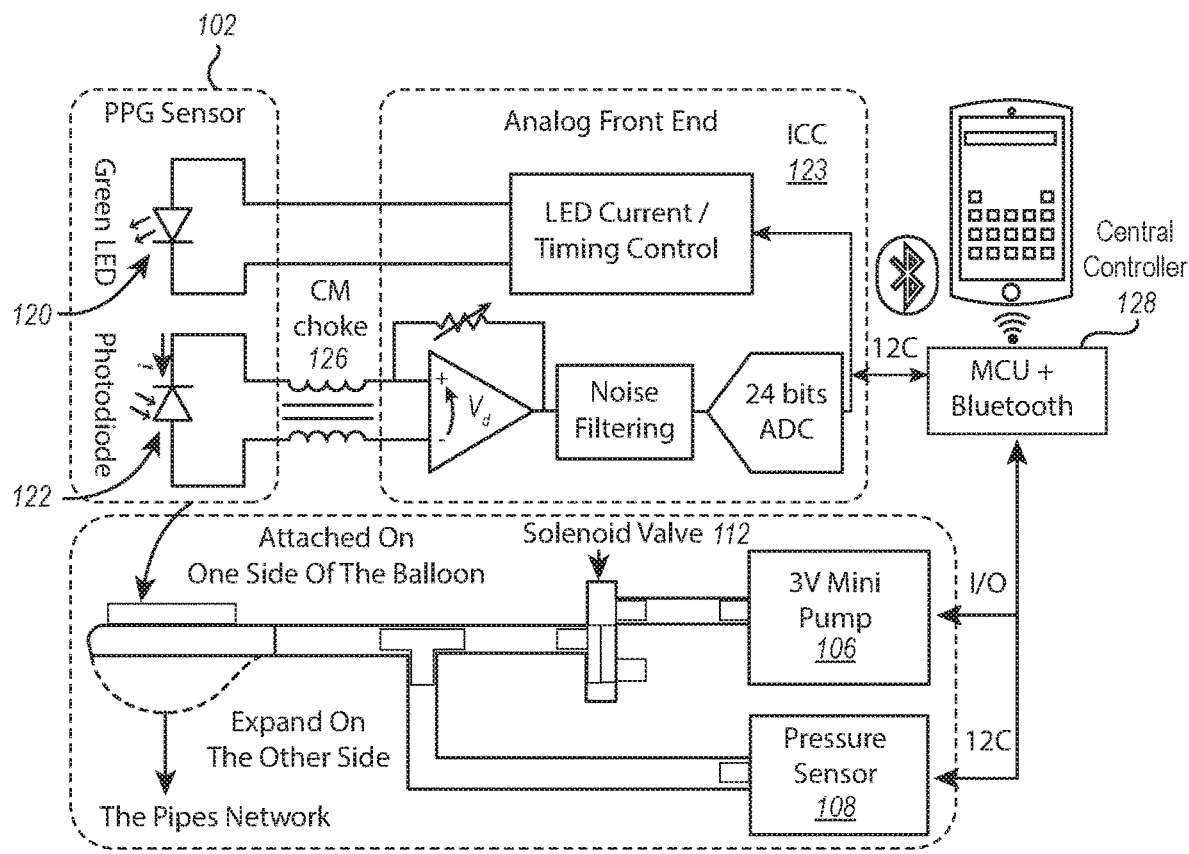
FIG. 4 illustrates a module block diagram of an in-ear blood pressure measuring device.
Figure 5:
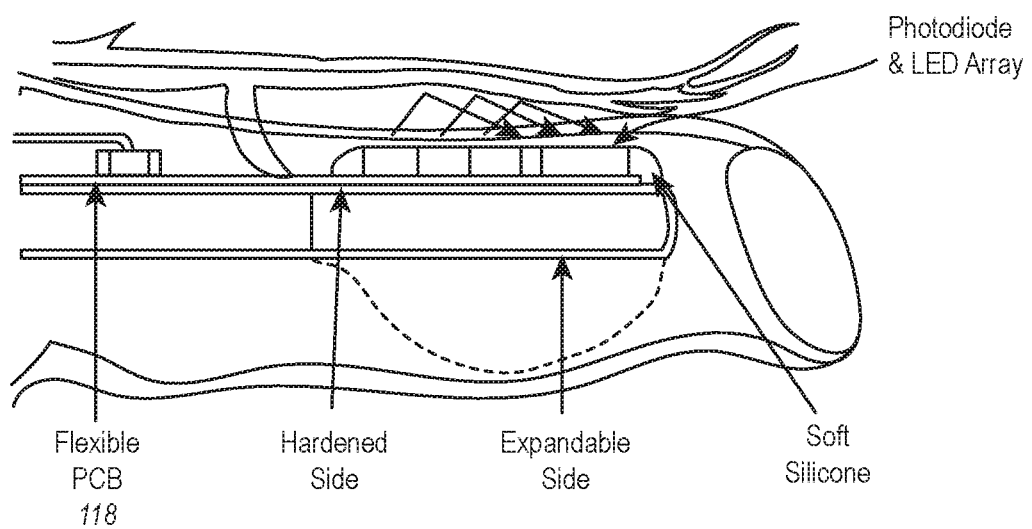
FIG. 5 illustrates an in-ear photoplethysmography pulse sensor and balloon design.

The pump/valve controlling module 124. To precisely control the air balloon, the pump/valve controlling module 124 is configured to ensure the consistency of contacting force for maintaining high-quality photoplethysmography measurements. Embodiments includes a digital pressure sensor 108 for measuring the contacting force, a pump 106, a solenoid valve 112 for filling and venting the air and a network of soft silicon pipes 114 (see FIG. 1) connecting them as illustrated in FIG. 4. When the measurement starts, the mini pump 106 will be activated to fill the balloon 104 with air, and while the valve 112 is closed, air is kept inside the network. When the photoplethysmography pulse sensor 102 has reached the ear canal wall, the pump 106 is stopped, and the balloon 104 is kept in an inflated state for photoplethysmography measurement. Pressure values inside the channel are sampled and streamed to the central controller 128. After the measurement is completed, the valve 112 will be opened to release the contained air and let the balloon 104 return to its normal state.

Photoplethysmography sensing requires tight contacting points between the sensors and the skin for accurate measurement. However, keeping the sensor in contact with the skin at all times might generate discomfort to the user for long term use. To overcome this challenge, the sensor is designed to be flexible and operates as an in-ear balloon 104 to only contact the human skin tightly when conducting photoplethysmography measurements. Specifically, the photoplethysmography pulse sensor 102 is mounted on top of a small balloon 104 which can be pumped up or vented out via a controller 124. Furthermore, the circuit for the photoplethysmography pulse sensor 102 is configured to deform as the balloon 104 inflates flexibly. It is engineered on the side of the balloon 104 where it can stay stable as the balloon 104 inflates and deflates.

Since the balloon 104 is configured to be inserted into the ear canal, it is designed to have the following characteristics: (1) bio-compatibility, it does not contain substances which could be harmful to the human body in its material; (2) safety and robustness, as the balloon 104 needs to sustain a certain amount of air pressure for the measurement and also accommodate various sizes of human ear canals, (3) user's comfort, the human ear canal is thin and sensitive, thus, the balloon 104 is designed to be soft to make the user feel comfortable while providing enough pressure for the measurement.

In one embodiment, the integrated in-ear sensor is formed by integrating a photoplethysmography pulse sensor 102 with the balloon 104 of a Foley catheter made by POIESIS MEDICAL. The Foley catheter is 100% created from medical silicon so it can be safely and comfortably inserted inside the body. The SFH7050 photoplethysmography pulse sensor 102 from OSRAM fits well in the small size of the ear canal. It has the size of 4.7 mm×2.5 mm×0.9 mm and performs highly accurate measurements due to its special design of crosstalk blocking technique. The photoplethysmography pulse sensor 102 includes an LED 120 transmitter. In some embodiments, the LED 120 transmitter may be a bright green LED having the wavelength of 525 nm which is a common used wavelength in photoplethysmography measurement. The receiver is a sensitive photodiode 122 which captures the reflected lights from the LED 120 transmitter and infers photoplethysmography values. The sensor is driven by a specialized analog front end IC 123 (AFE4404) from Texas Instruments Inc., of Dallas, Texas. As illustrated in FIG. 4, this device provides an accurate built-in LED driver and a timing controller, an ultra-low noise transimpedance amplifier with a wide-range programmable gain, and a precision 24 bits ADC to control the SFH7050 sensors. To ensure high fidelity signals, a common-mode (CM) choke coil 126 is used as an analog low pass filter before the input of the IC 123. It helps to suppress CM noises induced by electromagnetic interference over the wires between the sensor and the IC 123. The digital data from the IC 123 is then streamed to a central controller 128 (part number MSP430F5529) through I2C communication with a sampling rate at 320 Hz.

The in-ear balloon 104 is hardened so it will only expand on one side. The other side is kept stable for the mounted LED 120 and photodiode 122. The photoplethysmography pulse sensor 102 is soldered on a thin layer (0.1 mm) of flexible PCB 118. The PCB 118 is then integrated on top of the balloon 104 catheter by using a thin layer of liquid silicone gel. After curing for one hour at 80° C., the bonding between the photoplethysmography pulse sensor 102 and catheter surface becomes hardened and stays robust. Furthermore, to make the sensing unit more comfortable inside of the ear, embodiments may be coated with Smooth-On Ecoflex 00-30 soft silicone around the edge of the sensor, covering all sharp corners. The surface of the sensor can be kept flat by using a glass slide, which is removed once the Ecoflex is cured. Thus, the flat surface of the sensor offers a better sensing ability.

Figure 7:
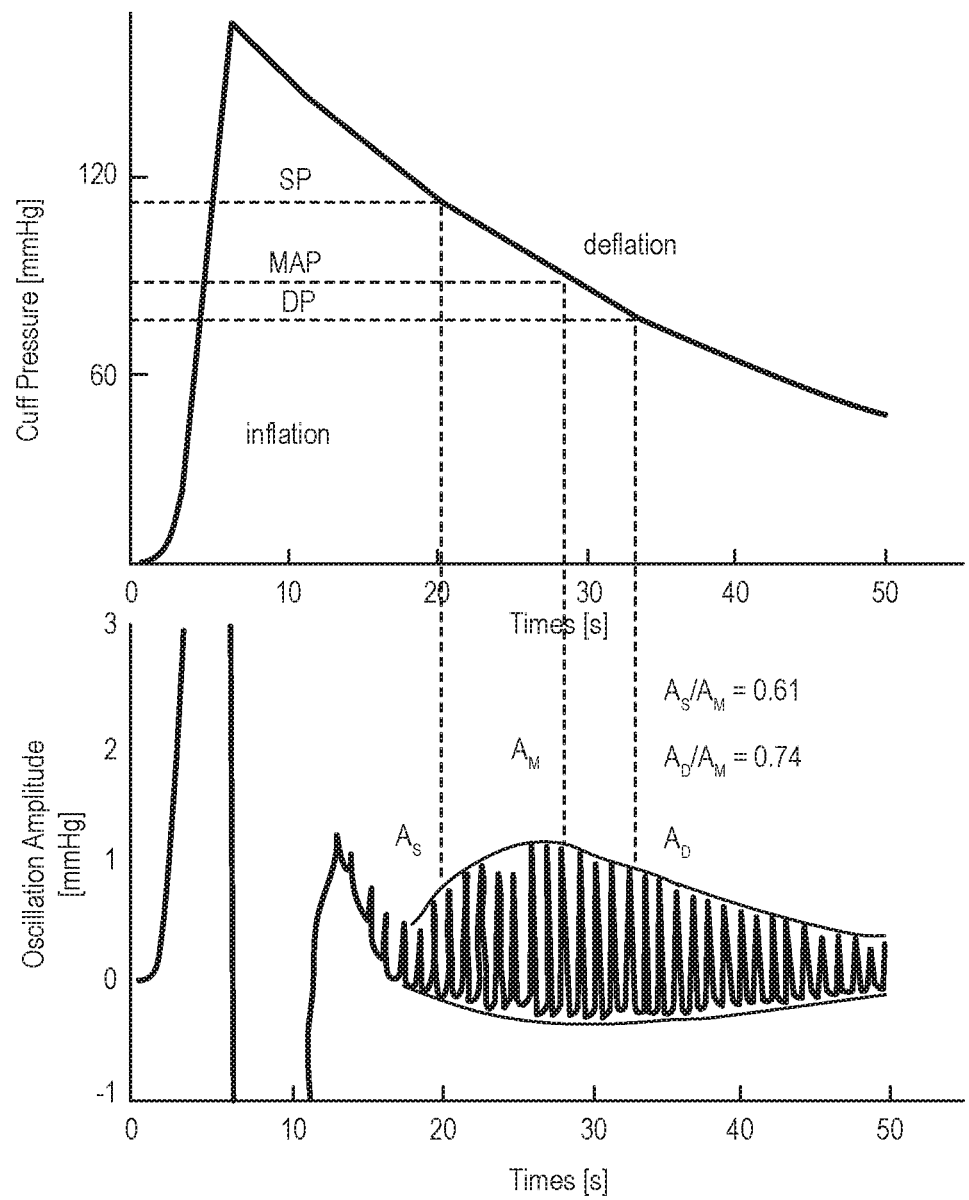
FIG. 7 illustrates a graph showing amplitude versus pressure.

The central controller 128 is responsible for (1) communicating to a mobile device through Bluetooth or other connections to receive commands and report sensing data, (2) driving the analog front-end IC to collect photoplethysmography measurement to the sensor, and (3) controlling the pump 106/valves to control the balloon 104 pressure for accurate photoplethysmography measurement. The relationship among pressure inside the balloon, its volume and diameter is nonlinear. Especially when the diameter is in the range from 7 mm to 9 mm inside the ear canal, the pressure has an initial peak called the equilibrium point accompanied by slow balloon 104 expansion as the constituent polymer makeup of the balloon 104 is altered. After the balloon 104 has reached its equilibrium point, the pressure inside the balloon 104 will keep stable or reduce even if its volume increases. FIG. 7 shows the relationship between pressure and diameter of the silicone-based balloon 104 used. In some embodiments, pressure values are not relied on to know whether the balloon 104 has reached the wall of the ear canal or not. Instead, the quality of photoplethysmography signals is observed and the pump 106 is stopped when clear photoplethysmography signals are observed.

In addition, an over-threshold protection mechanism is implemented to stop pumping the air in when the pressure inside the balloon 104 is over a threshold. Since the size of each person's ear canal is different with its diameter is in the range from 2.4 to 17.5 mm, Embodiments continuously and slowly inject air until one side of the balloon 104 touches the skin of user's ear canal and partially blocks the artery there. However, the balloon 104 also has a limit of how much air it can hold. Thus, care is taken to not inject too much air to make it permanently deformed or burst. From the balloon 104 datasheet and experimental burst tests, the failure pressure of the silicone-based balloon 104 is between 15 and 20 psi. Thus, the pressure inside the balloon 104 is continuously monitored by the central controller 128 and the pump 106 will be stopped if the pressure reaches more than 10 psi as a rule of thumb. This addresses the challenge of different ear canals size while maintaining the safety of the system.

Components in the designed module are chosen to operate with low power consumption and also have small sizes. This allows a user in a 'wearable' scenario to still have mobility when they wear the device, which is not possible with conventional cuff-based blood pressure measuring device. Additionally, less power consumption, in turn, will reduce the required capacity of the battery (which in some embodiments is a LiPo battery) which is often a limiting factor to minimizing the size of weight of the designed module. During the measurement, the central controller 128, AFE, pressure sensor 108, and Bluetooth module consumes at maximum only 4.6 mA, 325 uA, 1.7 mA, and 30 mA, respectively. The LED 120 transmitter, valve 112 and mini pump 106 draws 10 mA, 110 mA, and 150 mA. Thus, one embodiment consumes around 303 mA while the blood pressure measurement is running. On the other hand, only 4.95 mA is drawn when the measurement is not running. Thus, when a 400 mA Li—Po battery is used, up to 1.3 hours of continuously measuring is possible, which is equivalent to roughly 80 measurements.

The following presents details regarding measuring the systolic blood pressure with a partially blocked artery that does not depend on the fixed-blood pressure ratio. In conventional oscillometry, after detecting the MAP as highest pulse amplitude, the peak amplitude fractions are applied to estimate the location of systolic AS and diastolic AD amplitude. The ratio of AS and Am is 0.61, whereas the ratio between the AD and Am is 0.74. However, the ratio is not stable. In addition, these ratios are only for arm cuff blood pressure monitoring devices. Deriving an in-ear oscillation ratio requires a huge data set and an invasive method for measuring blood pressure from inside the ear as reference. the method is independent of the ratio and does not completely occlude the artery. In fact, the pressure only needs to be slightly higher than MAP. one illustrated embodiment determines the MAP and diastolic blood pressure first, from direct measurements and then infers systolic blood pressure indirectly.

To estimate the systolic blood pressure ($P_S$) given the pressure of MAP ($P_m$) and diastole ($P_D$), Eq. 1 above is applied, where $\beta$ is the systole ratio of the cardiac cycle. While $\beta$ is generally regarded as a fixed value and is widely accepted, but, it is developed for the brachial artery on the arm, not for those inside the ear. In one embodiment system, an adaptive estimation for $\beta$ is used. To help understanding, the derivation of the Eq. 1. By considering one photoplethysmography cycle, one can formulate MAP as follows: $P_m = \Sigma_{\beta-1}{}^{\tau n} P(i)/n$ in discrete form or $P_m = x/\tau \int_0^\tau P(t)dt$ in continuous form. By assuming systole belongs to the interval (0, $\tau\beta$) and diastole is from ($\tau\beta, \tau$), $P_m$ is the total pressure average of systole and diastole.

$$P_m = \frac{1}{\tau}\int_0^{\tau\beta} P(t)dt + \frac{1}{\tau}\int_{\tau\beta}^{\tau} P(t)dt \qquad (2)$$

Then, the first term and second term are multiplied by $\beta$ and $1-\beta$ respectively.

$$P_m = \beta \left[ \frac{1}{\tau\beta} \int_0^{\tau\beta} P(t)dt \right] + (1-\beta) \left[ \frac{1}{\tau(1-\beta)} \int_{\tau\beta}^{\tau} P(t)dt \right] \quad (3)$$

$$\frac{1}{\tau\beta} \int_0^{\tau\beta} P(t)dt$$

is the average of systolic blood pressure and $$\frac{1}{\tau(1-\beta)} \int_{\tau\beta}^{\tau} P(t)dt$$

is the average of diastolic blood pressure. Eq. 1 is equivalent to Eq. 3 by substituting $$P_S = \frac{1}{\tau\beta} \int_0^{\tau\beta} P(t)dt \text{ and } P_D = \frac{1}{\tau(1-\beta)} \int_{\tau\beta}^{\tau} P(t)dt.$$

Figure 8:
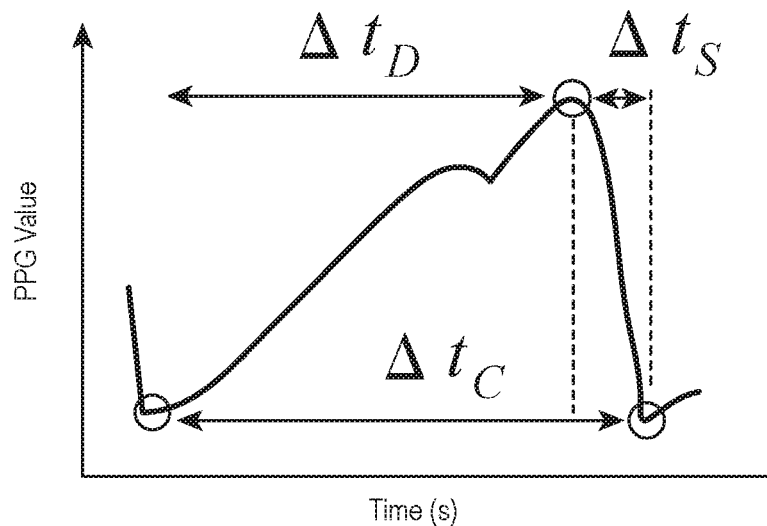
FIG. 8 illustrates systolic fraction $\beta$ detection.
Figure 8:
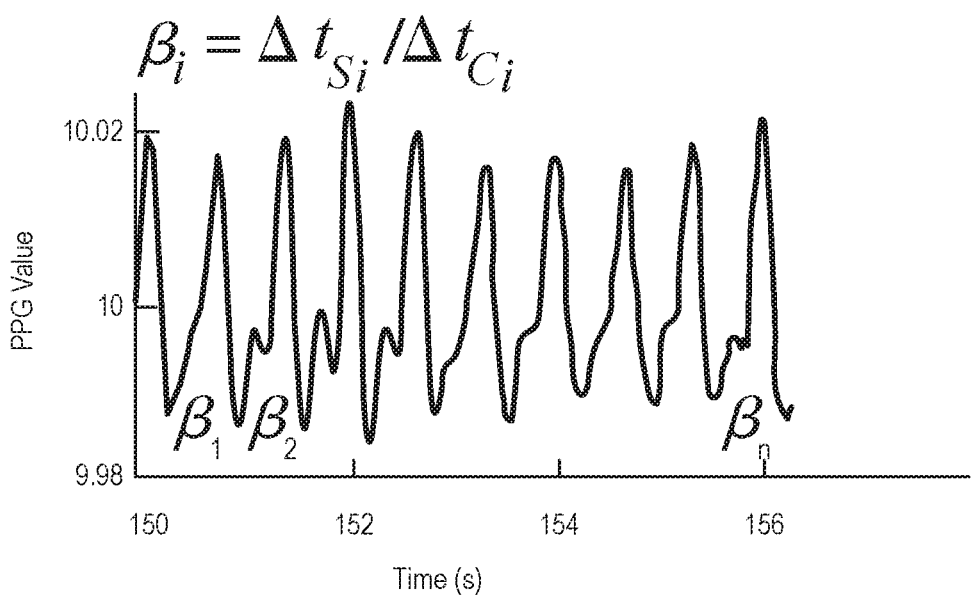
Figure 9:
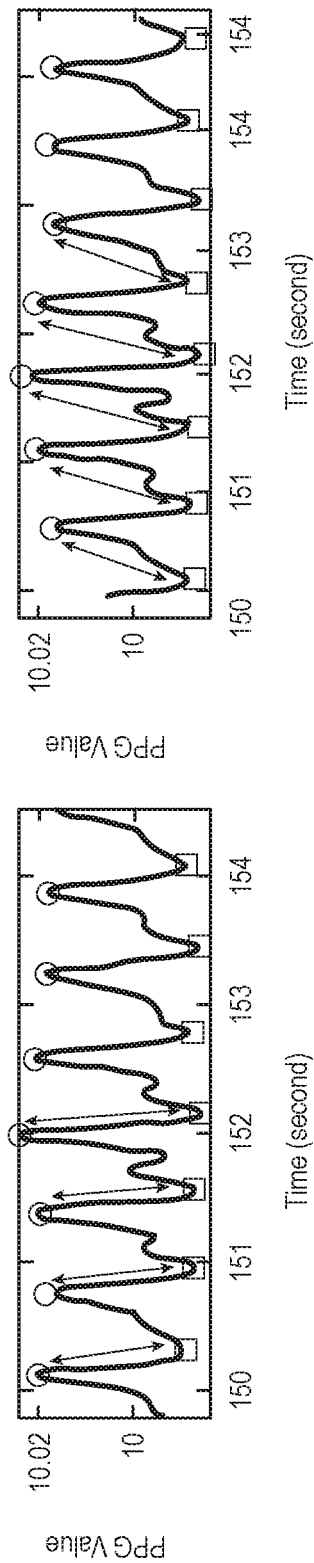
FIG. 9 illustrates inconsistency of conventional peak to peak computations.
Figure 10:
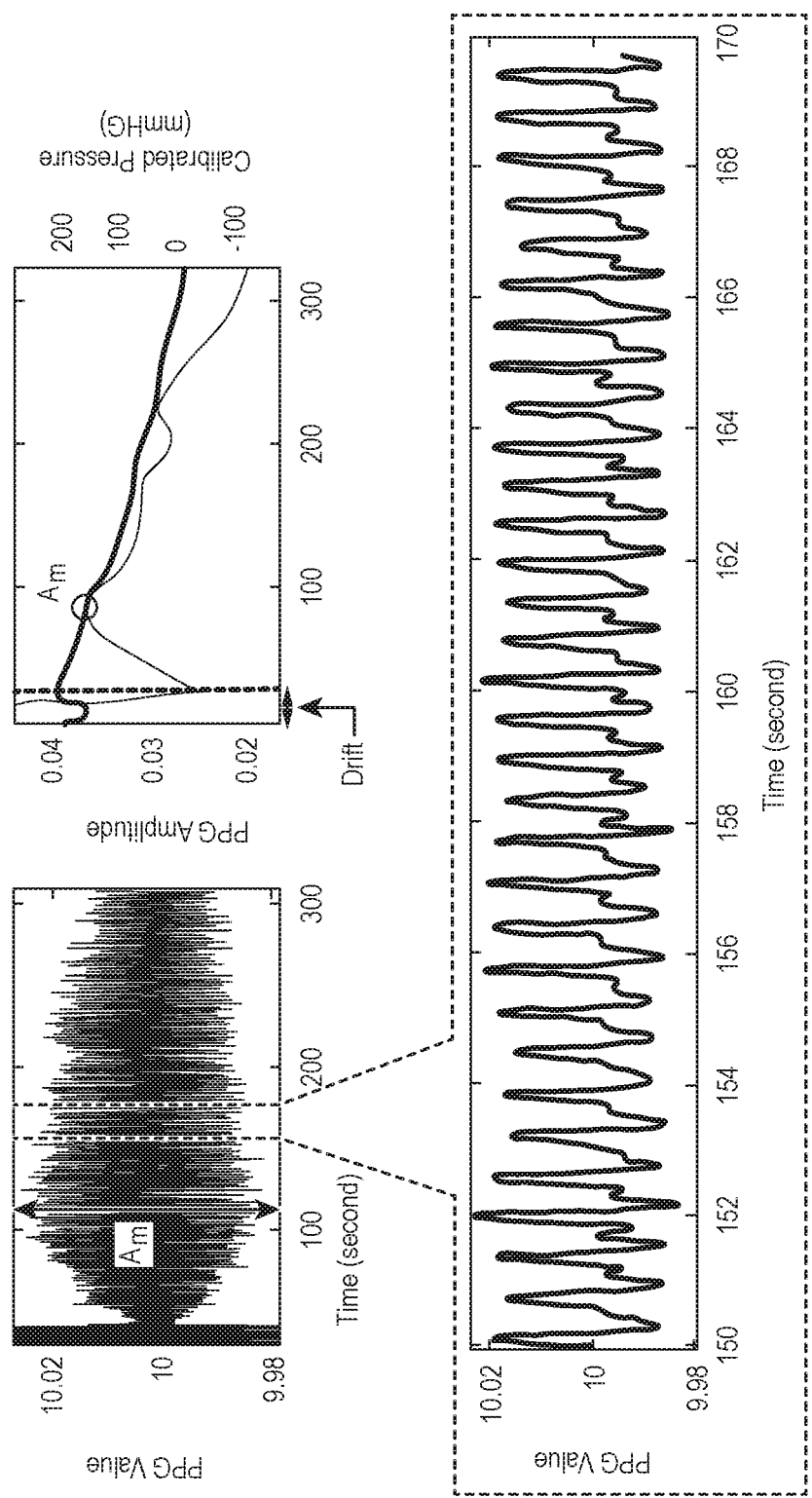
FIG. 10 illustrates an in-ear photoplethysmography signal with corresponding amplitude and pressure.
Figure 11:
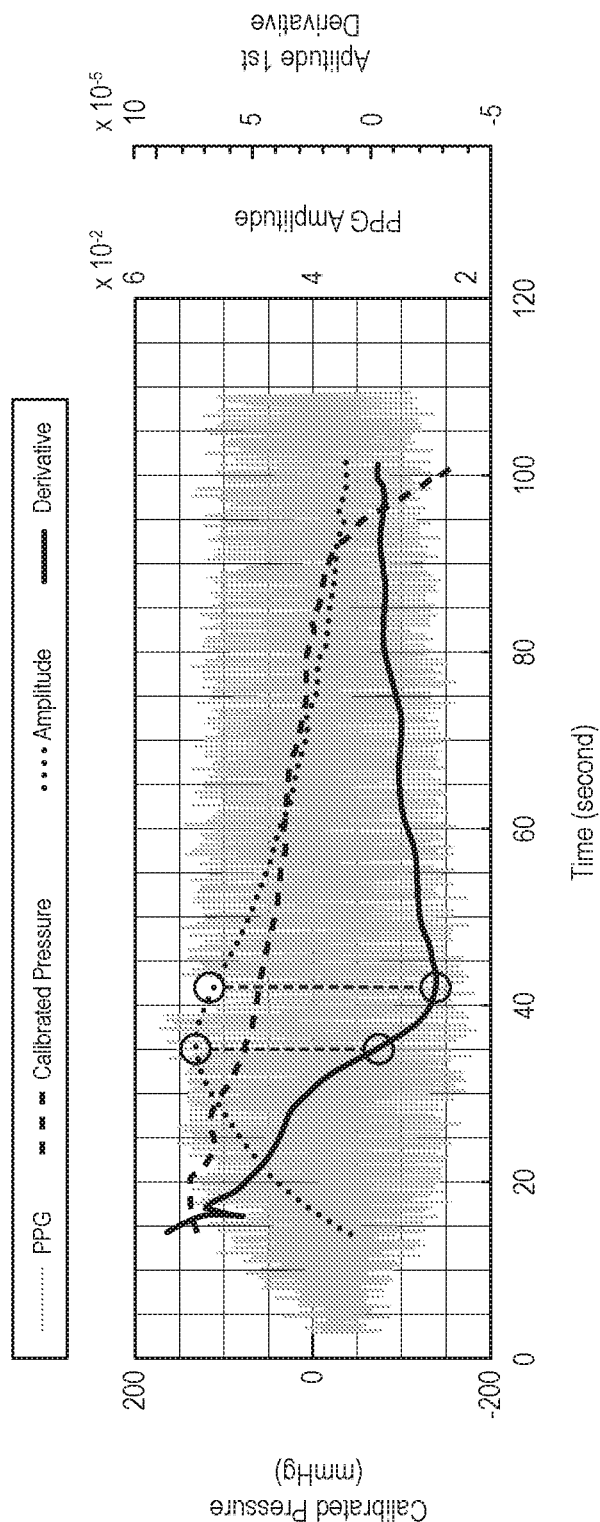
FIG. 11 illustrates a $1^{st}$ derivative of photoplethysmography amplitude disclosing diastolic blood pressure.

In one cycle, the peak and two trough points are detected and the their positions are subtracted in sequence as shown in FIG. 8. $\Delta t_D$, $\Delta t_S$ and $t_C$ are the duration of diastolic, systolic and the whole cycle respectively. The systolic fraction is $\beta = \Delta t_S/\Delta t_C$. Given a frame of n cycles, $\beta$ can be computed by averaging all $\beta_i$ in the frame. In a real-time system, some embodiments only collect the first 10 cleanest frames to estimate the systolic fraction.

Some embodiments determine MAP and diastolic blood pressure prior to estimating the systolic blood pressure mentioned above. Their estimation procedures are described in the following sections.

MAP represents the pulse pressure or the highest photoplethysmography amplitude. The precise location depends on the quality of the amplitude. In the following discussion, issues related to using peak-to-peak to calculate amplitude of a real-time data are discussed and an improvement is shown. In addition, sometimes, a sharp drift occurs when switching from inflation to deflation. The drift's amplitudes are higher than that of the real MAP, leading to a false detection problem. A solution to address the issue of drift is shown in this section.

To compute the peak-to-peak amplitude of a window sample containing multiple pulses, conventional wisdom calculates the amplitude every cycle and averages them. The following discusses a margin of error and illustrates an improvement. FIG. 12 (a) demonstrates when the first peak appears before the first trough, then, the amplitude is calculated by subtracting the peak to the right-side trough. However, when the trough occurs first, the left-side trough is subtracted as shown in FIG. 12 (b). Since the appearance of peak or trough is variable, the amplitude obtained from each frame is inconsistent. To obtain a unique calculation, the first trough is omitted so that FIG. 12 (b) can convert into FIG. 12 (a). Let P={$p_i$, i=$\overline{1,n}$} and B={$b_i$, i=$\overline{1,m}$} represent the position sets of peaks and trough of photoplethysmography signal X. The amplitude of each cycle, denoted as ampi, can be derived consistently as follows:

$$amp_i = \begin{cases} X(p_i) - X(b_i), & p_i < b_i \\ X(p_i) - X(b_i+1), & \text{otherwise} \end{cases} \quad (4)$$

FIG. 13 (a) demonstrates photoplethysmography signal variation with respect to reducing pressure. The bottom panel displays a photoplethysmography signal sample from 150th to 170th seconds. FIG. 13 (b) shows the corresponding amplitude derived with the peak-to-peak method.

To detect the correct MAP point instead of ones belonging to the drift, an additional criteria leveraging the local maxima property is imposed. Specifically, MAP is not only the maximum amplitude point, it also indicates the pulse amplitude transient state of increasing to decreasing. In contrast, points within the drift are not local maximums. Therefore, the following steps are employed to precisely detect the MAP.

1. Detect pulse amplitude's local maximums. This step confirms the removal of points belonging to the drift.

2. The highest value of local maximums corresponds to the MAP location.

Since the oscillation ratios are not applied to one illustrated embodiment, a non-ratio method is used to estimate the diastolic blood pressure. When the pressure passes the MAP point, it will reach the point of diastole that yields the following unique signature: amplitude rapidly decreases once the pressure passes the MAP and moderately decreases once it reaches the diastole point. In other word the diastolic blood pressure position occurs at the highest decreasing amplitude. It can be formulated as the minimum of the first derivative amplitude. FIG. 14 illustrates this concept. The dashed line represents the photoplethysmography amplitude, the solid line is the first derivative, the dotted line depicts the calibrated pressure and the grayscale shading is the photoplethysmography signal. In this example, the drift does not occur, thus the MAP is the local maxima of the amplitude, which corresponds to the 0 point of the first order derivative. After the MAP, a rapid decrease is observed until the $43^{rd}$ second, corresponding to the minimal first order derivative and indicates the location of diastolic blood pressure.

Due to the sensitivity of the pulse signal inside the ear, a set of criteria are defined to qualify the correct pulse shape. This set of criteria serves to remove non-pulse data chunks and detect the correct location to measure blood pressure. In this section signal processing techniques are illustrated. In some embodiments, the recording signal is processed in real-time with a sliding window of approximately 4 seconds with 90% overlap. Before extracting the blood pressure measurement, each window is pre-processed as follows:

The signal qualification aims to omit non-pulsatile data and movement noise from the user and in-ear sensor probe with:

The ideal photoplethysmography signal has fixed peak-to-peak intervals, however, as the photoplethysmography signal is quasi-periodic there is interval variability. The PIV is calculated as the standard deviation of all peak intervals in the current window. In normal conditions, the PIV falls under a certain threshold. However, the sensor is prone to movement noise, which disrupts the photoplethysmography trend and the corresponding peak interval. This leads to a drastic change in the peak-to-peak intervals with increasing PIV, which indicates that the current processing window is contaminated by noise, and lack of which indicates it is in good condition. In the application, a PIV threshold of 1.1 is sufficient to detect the distortion.

PIV qualifies pulse signal based on quasi-periodic properties. Which is sufficient to calculate the heart rate, but inadequate to compute the photoplethysmography amplitude. Consider the two data chunks in FIG. 15, both clean and distorted signals have similar NV scores when their peaks almost overlap each other. However, the distorted signal peak height or amplitude is inconsistent. The underline marks non-pulse shaped signals. Therefore, some embodiments restrict the signal based on the pulse shape for the motion elimination model. Among different techniques, entropy can classify the pulse wave form by quantifying how much the signal probability density function differs from a uniform distribution. The entropy S of a signal x is defined as $S(x)=-\Sigma_{i=1}^{n}x[i]^2 \hat{log}_e(x[i]^2)$ the change in signal shape. A chunk of photoplethysmography data is clean whenever all pulses have similar entropy. In other words, the variance of entropy should be smaller than a threshold of 230. Algorithm 1 below summarizes estimating a photoplethysmography signal entropy window. Given a window signal with n samples and a bottom indices list, each pulse is isolated by collecting a data between $b_i$ and $b_{i+1}$. The entropy is calculated for all extracted pulses and stored in a list ls. Finally, the entropy variance is obtained by computing the variance of ls.

Algorithm 1: PPG signal Entropy Variance

```
   input : x /* Current window signal with n samples */
           B /* List of bottom indices */
   output: vS /* Variance Entropy of current window */
1  ls← [ ]; /* List entropy */
2  for each sample b_i in B do
3  |_ u ← getSubSignal(x,b_i,b_i +1);ls[i] calc Entropy(u);
4  vS ← calcVariance(ls);
5  return vS;
```

In one embodiment, a finite impulse response (FIR) bandpass filter is applied in the range of 0.42-3.33 Hz to obtain the photoplethysmography amplitude. The photoplethysmography peak is used to predict the amplitude and blood pressure; which occur between 0.42 Hz and 3.33 Hz corresponding to the human heart rate range of 25 to 200 beat-per-minutes.

High frequency noise present in photoplethysmography amplitude can corrupt the true location of MAP and diastole, thereby increasing the error rate. A comparison between Gaussian and Median filtering is conducted to identify the optimal amplitude smoothing technique. To quantify the granularity level $\eta$, the standard deviation of differences $\eta=\sigma(dx/dt)$ is used with x as the interested signal. FIG. 16 (a) shows that Gaussian filtering is more fine-grained than Median filtering. In particular, the granularity level $\eta$ of Gaussian filtered signals is one order of magnitude higher than the Median kernel, thereby, confirming the choice. The Gaussian kernel h is computed via the following equation: $h[i]=e^{-(i-w_h/2)^2/2\sigma_h^2}$, i-1, $w_h$, where $W^h$ is the filter size and $\sigma_h=w_h/5$.

During deflation, pressure changes should yield a linear trend. However, the balloon's structure is composed of multiple segments as shown in FIG. 16 (c), which induces a faster contraction when crossing the border between segments. This event causes spikes on the pressure deflation raw signal as shown in FIG. 16 (b). Unlike the amplitude, there is minimal granularity score difference between the two filtering approaches FIG. 16 (b). Therefore, the Median filter is used to address those spikes, as small drifts are still observed at either end following Gaussian filtering.

Each heartbeat interval creates one local peak which can be differentiated using a peak detection algorithm within each predefined nonoverlapping sub-window. A signal sample $s_i$ is considered the peak if it is the maximum of that window.

Photoplethysmography signal quality is evaluated when being captured from inside the ear. FIG. 22(a) illustrates the 4 most common positions the sensors were located. 10 seconds of data was collected from each participant separately from the main test for this evaluation. FIG. 19(b) shows that the signal power is highest at position P2 on the left side.

The current off-the-shelf medical balloon 104 shape does not respond linearly to pressure changes. This causes several issues. One of which is the appearance of spikes mentioned above that can be removed with median filtering. Since the main purpose of the balloon, used in some embodiments, is a urinary catheter, it has a high level of stiffness and thus demands a strong pressure to break the equilibrium point. In addition, unlike the cuff, the elasticity of the balloon 104 recoils quickly to its original state at the onset of deflation. Therefore, it causes a large amount of pressure input into the pressure sensor that sometimes overwhelms the pressure sensor. As a result, some embodiments may be implemented with an improved linearity of pressure versus expansion for the balloon's material. This material has a more linear expansion vs pressure ratio than other materials, is comfortable for the user, but still complies with the safety requirement.

Performing the blood pressure estimation on a mobile device may lead to latency problems. Some embodiments reduce latency by performing processing directly on the central controller 128.

Safety control and monitoring: Embodiments implement a safety threshold for the pressure and use a low power DC pump 106 to protect users. One illustrated embodiment can be made even more safe by supervising the illustrated embodiment placement to ensure that users don't place it too deep inside their ear.

While some embodiments of one illustrated embodiment implement standalone devices, other embodiments may integrate the illustrated embodiment into other ear-worn devices, such as hearing aids, headphones, ear-buds, or other devices.

Following are some further example embodiments of the invention. These are presented only by way of example and are not intended to limit the scope of the invention in any way. Embodiments within the scope of this disclosure may include any one or more of the following elements, and features of elements, in any combination.

One embodiment includes a device for measuring blood pressure from inside an ear. The device includes a medical balloon configured in size and shape to be inserted into a user's ear; an electronically controlled pump coupled to the medical balloon; a pressure sensor coupled to the medical balloon; a pulse sensor coupled to the medical balloon configured to capture a pulse signal from inside the ear; and an estimation module coupled to the pulse sensor and the pressure sensor, the estimation module configured to estimate blood pressure from the pulse signal and pressure from the pressure sensor.

In some embodiments of the device the pulse sensor comprises a light-based sensor.

In some embodiments of the device, the estimation module executes a non-ratio oscillatory algorithm to measure blood pressure without the need of a preset systolic and diastolic detection ratio.

In some embodiments of the device, the non-ratio oscillatory algorithm comprises a systolic detection algorithm based on a fraction of a cardiac cycle.

In some embodiments of the device, the non-ratio oscillatory algorithm comprises a diastolic detection algorithm given a slope of an oscillatory trend during a diastolic phase.

In some embodiments of the device, the non-ratio oscillatory algorithm comprises a peak-to-peak calculation to estimate amplitude of a pulse signal.

In some embodiments of the device, the non-ratio oscillatory algorithm comprises an algorithm to qualify a pulse signal based on variance entropy of a pulse wave.

In some embodiments of the device, the device is used to benefit undiagnosed white coat hypertension, undiagnosed masked hypertension or hemodialysis patients who require frequent blood pressure monitoring.

Another embodiment includes a device for measuring blood pressure from inside an ear, the device comprising: a medical balloon configured in size and shape to be inserted into a user's ear; an electronically controlled pump coupled to the medical balloon; a pressure sensor coupled to the medical balloon; a pulse sensor coupled to the medical balloon configured to capture a pulse signal from inside the ear; and wherein the device is configured to be coupled to an estimation module, the estimation module configured to estimate blood pressure from the pulse signal and pressure from the pressure sensor.

In some embodiments of the device, the device is configured to be coupled to the estimation module via a wireless connection.

In some embodiments of the device, the device is configured to be coupled to the estimation module via a Bluetooth connection.

In some embodiments of the device, the estimation module is implemented in at least one of a smart phone, smart watch, or tablet.

Another embodiment includes a method of measuring blood pressure from inside an ear, the method comprising: inserting a medical balloon into a user's ear; inflating the balloon; sensing pressure using a pressure sensor coupled to the medical balloon; measuring a pulse signal using a pulse sensor coupled to the medical balloon; and estimating blood pressure from the pulse signal and pressure from the pressure sensor.

Some embodiments of the method are practiced where measuring a pulse signal using a pulse sensor coupled to the medical balloon comprises measuring a light signal.

Some embodiments of the method are practiced where estimating blood pressure from the pulse signal and pressure from the pressure sensor comprises executing a non-ratio oscillatory algorithm to measure blood pressure without the need of a preset systolic and diastolic detection ratio.

Some embodiments of the method are practiced where the non-ratio oscillatory algorithm comprises a systolic detection algorithm based on a fraction of a cardiac cycle.

Some embodiments of the method are practiced where the non-ratio oscillatory algorithm comprises a diastolic detection algorithm given a slope of an oscillatory trend during a diastolic phase.

Some embodiments of the method are practiced where the non-ratio oscillatory algorithm comprises a peak-to-peak calculation to estimate amplitude of a pulse signal.

Some embodiments of the method are practiced where the non-ratio oscillatory algorithm comprises an algorithm to qualify a pulse signal based on variance entropy of a pulse wave.

Some embodiments of the method include using results of estimating blood pressure from the pulse signal and pressure from the pressure sensor to benefit undiagnosed white coat hypertension, undiagnosed masked hypertension or hemodialysis patients who require frequent blood pressure monitoring.

Embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A device for measuring blood pressure from inside an ear, the device comprising:
   a medical balloon configured in size and shape to be inserted into a user's ear;
   an electronically controlled pump coupled to the medical balloon;
   a pressure sensor coupled to the medical balloon;
   a pulse sensor coupled to the medical balloon configured to capture a pulse signal from inside the ear; and
   an processor coupled to the pulse sensor and the pressure sensor, the processor configured to:
   estimate blood pressure from the pulse signal and diastolic pressure from the pressure sensor without reaching a systolic pressure within the ear.

2. The device of claim 1, wherein the pulse sensor comprises a light-based sensor.

3. The device of claim 1, wherein the processor executes a non-ratio oscillatory algorithm to measure blood pressure without using a preset systolic and diastolic detection ratio.

4. The device of claim 3, wherein the non-ratio oscillatory algorithm comprises a systolic detection algorithm based on a fraction of a cardiac cycle.

5. The device of claim 3, wherein the non-ratio oscillatory algorithm comprises a diastolic detection algorithm given a slope of an oscillatory trend during a diastolic phase.

6. The device of claim 3, wherein the non-ratio oscillatory algorithm comprises a peak-to-peak calculation to estimate amplitude of a pulse signal.

7. The device of claim 3, wherein the non-ratio oscillatory algorithm comprises an algorithm to qualify a pulse signal based on variance entropy of a pulse wave.

8. A method of measuring blood pressure from inside an ear, the method comprising:
   inserting a medical balloon into a user's ear;
   inflating the balloon;
   sensing pressure using a pressure sensor coupled to the medical balloon;
   measuring a pulse signal using a pulse sensor coupled to the medical balloon; and
   estimate blood pressure from the pulse signal and diastolic pressure from the pressure sensor without reaching a systolic pressure within the ear, by:
   estimating blood pressure from the pulse signal by analyzing the timing of pulse signals derived from a PPG sensor and correlating these signals with pressure variations detected by the pressure sensor, and
   applying signal processing algorithms to reduce artifacts and distortions.

9. The method of claim 8, wherein measuring a pulse signal using a pulse sensor coupled to the medical balloon comprises measuring a light signal.

10. The method of claim 8, wherein estimating blood pressure from the pulse signal and pressure from the pressure sensor comprises executing a non-ratio oscillatory algorithm to measure blood pressure without using a preset systolic and diastolic detection ratio.

11. The method of claim 10, wherein the non-ratio oscillatory algorithm comprises a systolic detection algorithm based on a fraction of a cardiac cycle.

12. The method of claim 10, wherein the non-ratio oscillatory algorithm comprises a diastolic detection algorithm given a slope of an oscillatory trend during a diastolic phase.

13. The method of claim 10, wherein the non-ratio oscillatory algorithm comprises a peak-to-peak calculation to estimate amplitude of a pulse signal.

14. The method of claim 10, wherein the non-ratio oscillatory algorithm comprises an algorithm to qualify a pulse signal based on variance entropy of a pulse wave.

15. The method of claim 8, further comprising using results of estimating blood pressure from the pulse signal and pressure from the pressure sensor to benefit undiagnosed white coat hypertension, undiagnosed masked hypertension or hemodialysis patients who require frequent blood pressure monitoring.

* * * * *